(12) United States Patent
Ishimoto (10) Patent No.: US 7,339,860 B2
(45) Date of Patent: Mar. 4, 2008

(54) DISPLACEMENT MEASUREMENT

(75) Inventor: Tsutomu Ishimoto, Saitama (JP)

(73) Assignee: Sony Corporation, Tokyo (JP)

( * ) Notice: Subject to any disclaimer, the term of this patent is extended or adjusted under 35 U.S.C. 154(b) by 672 days.

(21) Appl. No.: 10/834,195

(22) Filed: Apr. 29, 2004

(65) Prior Publication Data

US 2004/0264314 A1 Dec. 30, 2004

(30) Foreign Application Priority Data

May 15, 2003 (JP) .............................. 2003-137764

(51) Int. Cl.
*G11B 7/00* (2006.01)
(52) U.S. Cl. ................. 369/44.32; 369/44.39
(58) Field of Classification Search ............... 369/44.32
See application file for complete search history.

(56) References Cited

U.S. PATENT DOCUMENTS

| | | | |
|---|---|---|---|
| 4,849,954 A * | 7/1989 | Yamaguchi | 369/53.19 |
| 5,220,549 A * | 6/1993 | Yanagidate | 369/44.29 |
| 5,247,165 A * | 9/1993 | Hiruta et al. | 250/201.3 |
| 5,351,230 A * | 9/1994 | Takeda et al. | 369/112.12 |
| 5,432,764 A * | 7/1995 | Chiyomatsu | 369/44.25 |
| 5,715,219 A * | 2/1998 | Takeda et al. | 369/44.41 |
| 6,282,161 B1 * | 8/2001 | Son et al. | 369/53.19 |
| 2005/0041557 A1 * | 2/2005 | Yagi et al. | 369/103 |

* cited by examiner

*Primary Examiner*—Wayne Young
*Assistant Examiner*—Van T. Pham
(74) *Attorney, Agent, or Firm*—Oblon, Spivak, McClelland, Maier & Neustadt, P.C.

(57) ABSTRACT

Laser light is irradiated from a lateral side of an optical disk (2) set in place to a peripheral side face of the optical disk (2), return light from the peripheral side face irradiated with the laser light is detected, and a displacement of the optical disk (2) is measured based on the detected amount of return light. Also, the focus is adjusted in relation to the information recording surface correspondingly to the measured disk displacement. Thus, a displacement of an optical disk can be measured in an extremely simple manner and with an extremely high accuracy, and information can accurately be recorded or reproduced to or from the optical disk with the focus being controlled.

10 Claims, 10 Drawing Sheets

DISPLACEMENT MEASUREMENT

BACKGROUND OF THE INVENTION

1. Field of the Invention

The present invention relates to a displacement measuring device and method, for measuring a displacement of an optical disk, and an optical recording/playback apparatus and method, for recording/reproducing information signals to/from an information recording surface of an optical disk.

This application claims the priority of the Japanese Patent Application No. 2003-137764 filed on May 15, 2003, the entirety of which is incorporated by reference herein.

2. Description of the Related Art

Recently, a recorder/player is used which optically records or reproduces information to or from an optical disk. Normally in the recorder/player, there is provided an optical pickup that writes or reads information signals to or from an information recording surface of the optical disk by focusing laser light on the recording surface. The optical pickup is designed to be movable at least radially of the optical disk and detect and write or read information signals along a recording track of the optical disk being rotated.

The optical disk is formed by injection molding of a plastic. The optical disk is likely to be warped due to a change of environmental conditions such as the temperature and humidity. During molding, a distortion, if any, of the molds used for the injection molding will possibly cause a surface undulation of the disk product. Also, the optical disk will possibly be set out of perpendicular to the optical pickup because of a physical relation with a disk seat in the recorder/player.

If an optical disk with such a warp or undulation or an optical disk set out of perpendicular is rotated, the information recording surface thereof will be off the focal point of an objective lens in the optical pickup or have an angle in relation to the focal plane of the objective lens, resulting in extremely poor characteristics of information signal recording and reproduction.

On this account, it has so far been proposed to measure a displacement of an optical disk, caused by a so-called axial runout developed are typically a contact measuring method in which an electrical micrometer is used to measure a displacement of the information recording surface of an optical disk, and non-contact measuring methods including a capacitance method in which a capacitance is detected and a displacement of the recording surface is measured based on the detected capacitance, and an eddy-current method in which an eddy current is produced and a displacement of the recording surface is measured based on the eddy current. Further, there has recently been proposed an axial-runout measuring device which calculates an irregularity or displacement of the information recording surface of an optical disk by measuring a vertical velocity component of an information recording surface of an optical disk with the use of the laser interference and serially adding together the measured results (cf. the Japanese Published Unexamined Patent Application No. 2000-048384).

In case a displacement of an optical disk is measured by the contact measuring method, however, the electrical micrometer has to be put in touch with the optical disk, which will possibly scratch the information surface of the optical disk.

Also, in case a displacement of an optical disk is measured by the capacitance method included in the non-contact measurement methods, since a capacitance detectable by the method is inversely proportional to a gap between the information recording surface of the optical disk and a capacitance detector, so only a very low voltage can be detected, which cannot assure any stable measurement.

To efficiently produce an eddy current in the eddy-current method, the object to be measured should desirably be metallic. However, each of such objects has to be calibrated, which needs excessive labor and costs.

Further, the above axial-runout measuring method using the laser interference needs a separate interference optical system, which leads to a difficulty in designing a compact measuring device. Also, such an interference optical system has to be calibrated with a high accuracy, which cannot be advantageous in the respect of the costs.

OBJECT AND SUMMARY OF THE INVENTION

It is therefore an object of the present invention to overcome the above-mentioned drawbacks of the related art by providing a displacement measuring device and method, extremely simple in configuration and capable of measuring a displacement of an optical disk with a high accuracy, and a recording/playback apparatus and method, capable of recording or reproducing information signals while controlling the focus in relation to a displacement of an optical disk.

The above object can be attained by providing a displacement measuring method including, according to the present invention, the steps of irradiating laser light from a lateral side of an optical disk set in place to a peripheral side face of the latter; detecting return light from the peripheral side face irradiated with the laser light; and measuring a displacement of the optical disk on the basis of a detection signal generated based on the detected amount of return light.

In the above displacement measuring device according to the present invention, the optical disk set in place is rotated for measurement of any displacement, and a displacement of the optical disk is measured based on a variation of the detection signal generated based on the amount of return light.

Also in the above device, the laser light is irradiated generally in parallel with an information recording surface of the optical disk.

Further in the above device, a parallel laser light may be irradiated to the peripheral side face of the optical disk.

Also the above object can be attained by providing a recording/playback apparatus for recording or reproducing information signals to an information recording surface of an optical disk, the apparatus including, according to the present invention, a disk seating means for setting the optical disk in place; a rotation drive means for rotating the optical disk set in place on the disk loading means; a light irradiating means for irradiating laser light from a lateral side of the optical disk to a peripheral side face of the latter; a light-detecting means for detecting return light from the peripheral side face irradiated with the laser light; a disk-displacement measuring means for measuring a displacement of the optical disk on the basis of a detection signal generated based on the return light detected by the light-detecting means; and a focus adjusting means for adjusting the focus in relation to the information recording surface correspondingly to the disk displacement measured by the disk-displacement measuring means.

Also the above object can be attained by providing a recording/playback method of recording or reproducing information signals to an information recording surface of an optical disk, the method including, according to the present invention, the steps of rotating the optical disk set in place; irradiating laser light from a lateral side of the optical disk set in place to a peripheral side face of the latter; detecting return light from the peripheral side face irradiated with the laser light; measuring a displacement of the optical disk on the basis of a detection signal generated based on the detected return light; and adjusting the focus in relation to the information recording surface correspondingly to the disk displacement measured by the disk-displacement measuring means.

These objects and other objects, features and advantages of the present invention will become more apparent from the following detailed description of the preferred embodiments of the present invention when taken in conjunction with the accompanying drawings.

DETAILED DESCRIPTION OF THE PREFERRED EMBODIMENTS

The present invention will be described in detail concerning the embodiments thereof with reference to the accompanying drawings.

Figure 1:
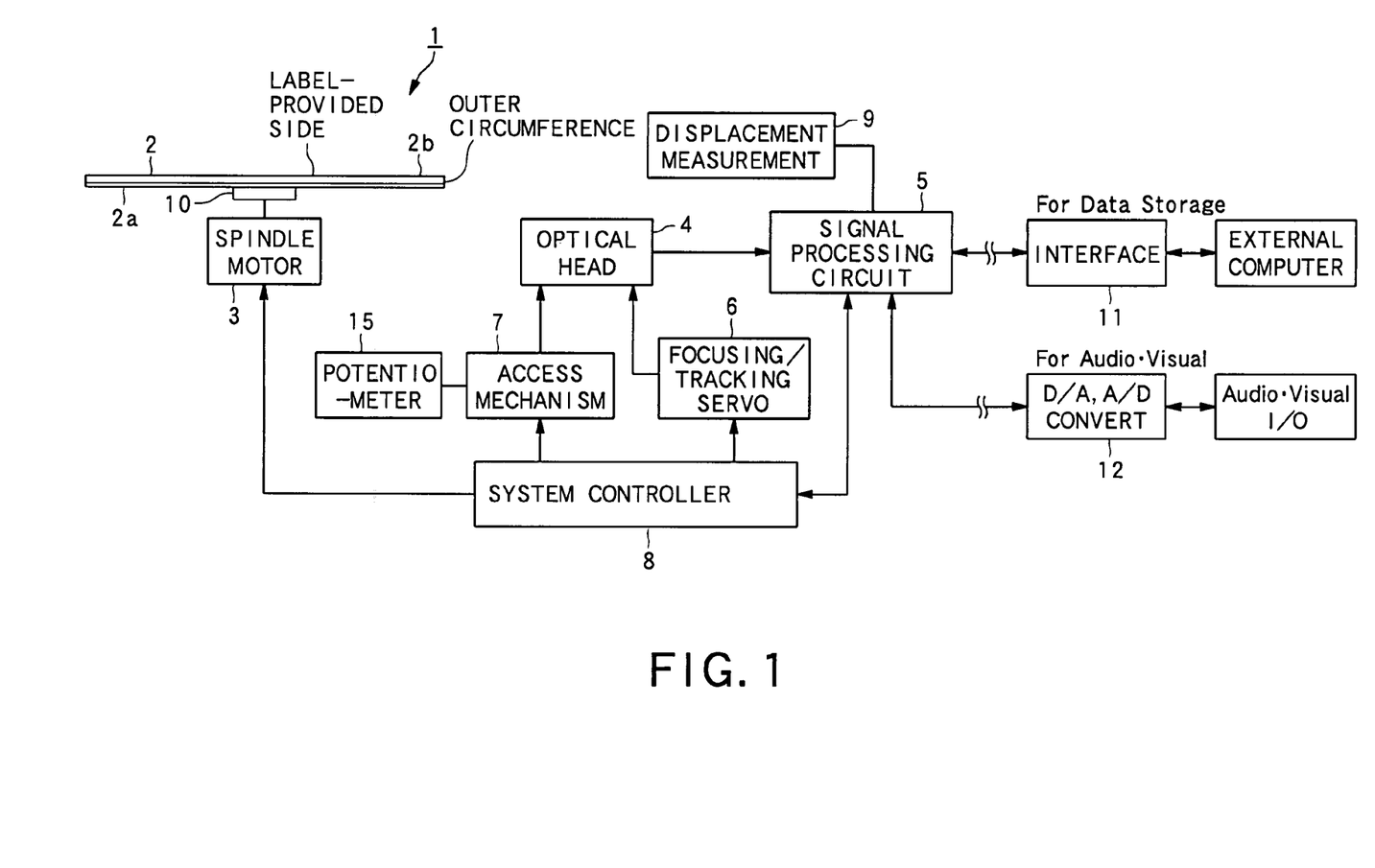
FIG. 1 is a schematic block diagram of the optical recorder/player having provided therein the displacement measuring device according to the present invention as a displacement pickup.

Referring now to FIG. 1, there is schematically illustrated in the form of a block diagram the optical recorder/player having provided therein the displacement measuring device according to the present invention as a displacement pickup. The optical recorder/player, generally indicated with a reference 1, is compatible with a variety of optical disks such as CD (compact disk), DVD (digital versatile disk), etc. As shown FIG. 1, the optical recorder/player 1 includes a spindle motor 3 that rotates an optical disk 2, an optical head 4 that irradiates a light beam onto an information recording surface 2a of the optical disk 2 and detects return light from the optical disk 2, a signal processing circuit 5 that generates a read signal and control signal on the basis of the return light detected by the optical head 4, a focusing/tracking servo control mechanism 6 for controlling the focusing and tracking on the basis of the control signal, an access mechanism 7 that moves the optical head 4 to a predetermined track on the optical disk 2, a system controller 8 that controls the spindle motor 3, focusing/tracking servo control mechanism 6 and access mechanism 7 on the basis of the signals generated by the signal processing circuit 5, a displacement measuring device 9 that detects a displacement of the optical disk 2, and a disk seat 10 that sets the optical disk 2 in place.

The spindle motor 3 is controlled by the system controller 8 to rotate the optical disk 2 at a predetermined velocity.

The optical head 4 irradiates a light beam onto the information recording surface 2a of the optical disk 2 being rotated by the spindle motor 3, detects return light from the information recording surface 2a and provides a signal of the return-light detection to the signal processing circuit 5. At this time, the optical head 4 emits a light beam having an optimum wavelength for the type of an optical disk 2 being rotated. For example, in case the optical disk 2 being rotated is CD-R, the optical head 4 emits a light beam whose wavelength is about 780 nm. In case the optical disk 2 is DVD, the optical head 4 emits a light beam having a wavelength of about 650 nm.

When the recorder/player 1 is in the playback mode, the signal processing circuit 5 demodulates, and makes error correction of, the read signal and control signal generated based on the return light detected by the optical head 4. Also, when the recorder/player 1 is in the recording mode, the signal processing circuit 5 adds a unique header information and extension-file header information to the recording signal supplied from an interface 11, by making time-division multiplex, for example. Also, when the recorder/player 1 is in the recording mode, the signal processing circuit 5 compresses the recording signal by coding, and then adds an error correction code to the compressed recording signal. The signal processing circuit 5 is connected to the displacement measuring device 9 to measure a disk displacement caused by an axial runout or the like of the optical disk 2 correspondingly to a voltage value of the signal of the return-light detection sent from the displacement measuring device 9.

In case the read signal demodulated and error-corrected by the signal processing circuit 5 is for reading data which are stored in a computer, it is sent to an external computer or the like via the interface 11. If the read signal is for reading audio/visual data, it is converted by a D-A/A-D converter 12 from digital to analog and sent to an audio/visual device.

Various control signals demodulated by the signal processing circuit 5 are supplied to the system controller 8. The system controller 8 will drive the focusing/tracking servo control mechanism 6 on the basis of a focus error signal and tracking error signal among such control signals.

The focusing/tracking servo control mechanism 6 includes a phase-compensation filter or the like, for example. It is controlled by the system controller 8 to control the focusing and tracking by moving the objective lens in the optical head 4 in biaxial directions, namely, toward and away from the optical disk 2 and also radially of the optical disk 2.

Also, the access mechanism 7 moves the optical head 4 radially of the optical disk 2 on the basis of a signal supplied from the system controller 8 to a predetermined recording track on the optical disk 2. The access mechanism 7 has additionally a potentiometer 15 disposed thereon to detect a radial distance over which the optical head 4 is moved.

The displacement measuring device 9 irradiates laser light from the lateral side of the optical disk 2 set in place to a peripheral side face 2b of the latter, and detects return light from the peripheral side face 2b irradiated with the laser light. Also, the displacement measuring device 9 generates, based on the detected amount of return light, a light-detection signal indicative of a deflection caused by the so-called axial runout or the like developed during molding or seating of the optical disk 2. The axial runout is caused by any warp of the optical disk during injection molding, by any surface undulation of the optical disk 2 due to a distortion of the molds used for the injection molding of the optical disk 2 or when the optical disk 2 is set out of perpendicular to the optical pickup because of a physical relation with the disk seat in the recorder/player. It should be noted that the peripheral side face 2b, referred to herein, of the optical disk 2 includes not only the periphery of the optical disk 2 but the outer-circumferential area of the information recording surface 2a and that of the label area of the surface of the optical disk 2 where there will be marked the contents of data stored in the optical disk 2.

The disk seat 10 is a so-called disk table or the like installed integrally on the spindle motor 3. The disk seat 10 is formed convex in the center thereof. The optical disk 2 has a central hole formed therein. The optical disk 2 is fixed by fitting the optical disk at the central hole on the convexity of the disk seat 10.

Figure 2:
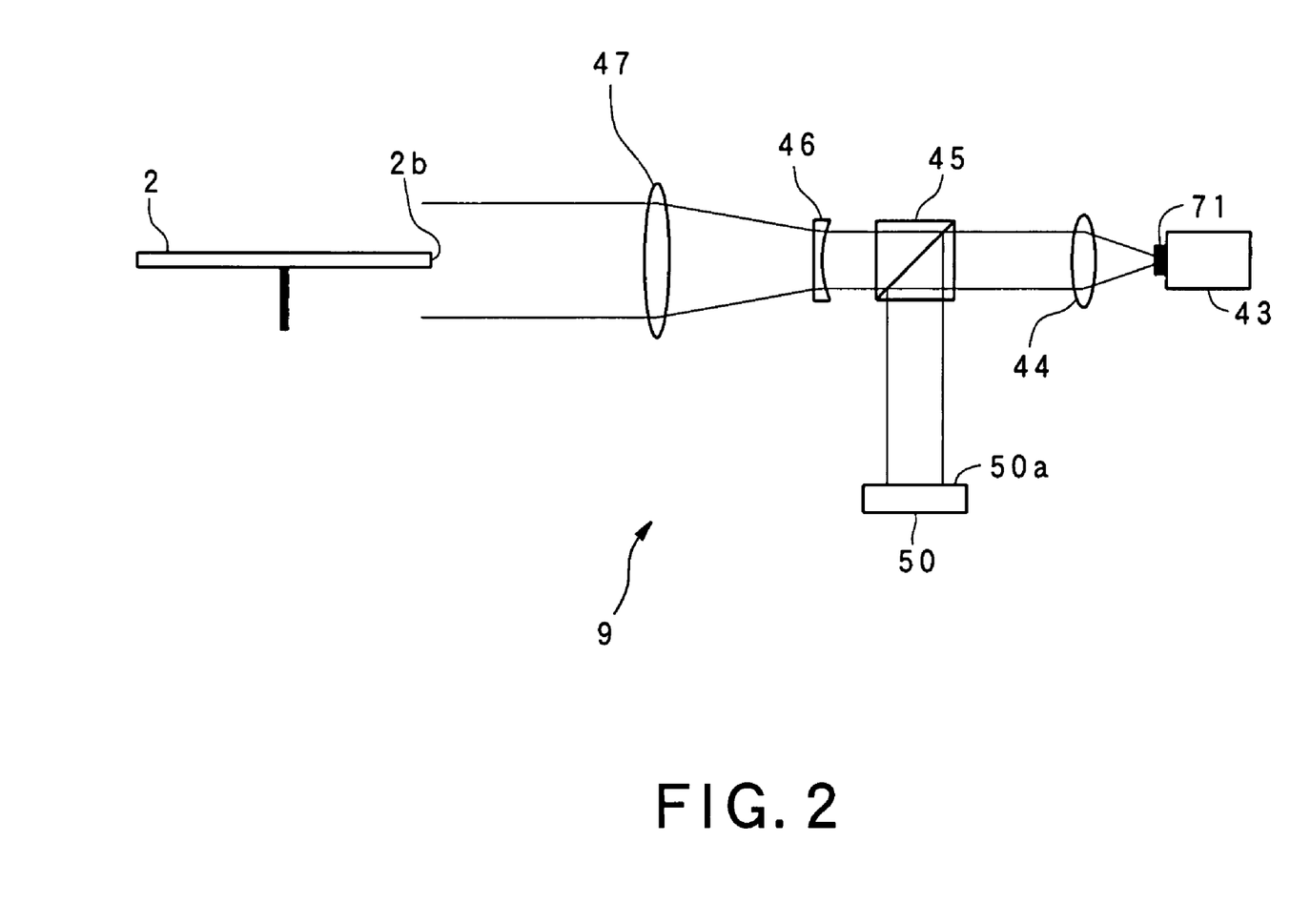
FIG. 2 schematically illustrates the displacement measuring device according to the present invention.

Next, the displacement measuring device 9 according to the present invention will be illustrated and described in more detail below:

The displacement measuring device 9 includes a holder 43 for holding a semiconductor laser 71, a first collimator lens 44 that parallelizes laser light emitted from the semiconductor laser, a beam splitter 45 disposed in the light path of the laser light having passed by the first collimator lens 44, a concave lens 46 that makes divergent the laser light having passed by the beam splitter 45, a second collimator lens 47 that parallelizes the laser light having passed by the concave lens 46, and a light-detecting element 50 that detects return light from the peripheral side face 2b of the optical disk 2.

The holder 43 has mounted thereon a semiconductor laser 71 that emits laser light having a predetermined wavelength. The semiconductor laser 71 uses the recombination light emission, and emits a divergent laser light. The laser light emitted from the semiconductor laser 71 and made to diverge is incident upon the first collimator lens 44 that will parallelize the incident laser light. The parallelized laser light will be incident upon the beam splitter 45.

The beam splitter 45 allows the laser light emitted from the semiconductor laser 71 to pass by toward the optical disk 2, and reflects return light from the optical disk 2 toward the light-detecting element 50, as shown in FIG. 2. It should be noted that in case the semiconductor laser 71 emits a polarized laser light, the beam splitter 45 may be designed as a polarized-beam splitter to prevent return light from the optical disk 2 from going back to the semiconductor laser 71. In this case, a quarter wave plate (not shown) may be disposed in the light path of the laser light having passed by the second collimator lens 47 to impart a phase difference of π/2 to the laser light passing by.

The parallel laser light having passed by the beam splitter 45 is made divergent by the concave lens 46, and then made parallel by the second collimator lens 47. Normally, the second collimator lens 47 is positioned for the beam center of the outgoing parallel light to be incident upon the peripheral side face 2b of an optical disk 2 not displaced. Also, the second collimator lens 47 may be positioned for the outgoing parallel light to be parallel to the information recording surface 2a of the optical disk 2.

Note that the concave lens 46 and second collimator lens 47 may be omitted to allow the laser light passing through the beam splitter 45 to be incident, as it is, upon the optical disk 2 without being made divergent. Also, the concave lens 46 and second collimator lens 47 may be disposed or omitted based on a supposed displacement of the optical disk 2 so that the beam width of the incident laser light can freely be adjusted.

The laser light irradiated from the lateral side of the optical disk 2 to the peripheral side face 2b of the latter is reflected by the peripheral side face 2b, passes by the second collimator lens 47 and concave lens 46 and then reflected by the beam splitter 45.

The light-detecting element 50 detects return light from the beam splitter 45, makes photoelectric conversion of the detected return light, and supplies the converted light as a light-detection signal to the signal processing circuit 5. The light-detecting element 50 is normally formed from a photodiode that generates a detection signal on the basis of the amount of return light. Alternatively, however, it may be formed from a position-sensing diode (PSD), for example. The return light is incident upon a light-detecting surface 50a of the light-detecting element 50. In case the light-detecting element 50 is formed from PSD, the light-detecting surface 50a is formed as a two-dimensional coordinate (of X and Y coordinates) and a return-light spot position is converted based on the amount of return light into a detection signal represented by the two-dimensional coordinate. The light-detecting element 50 formed from PSD will further be described below.

The displacement measuring device 9 is always in a fixed physical relation with the disk seat 10 on which the optical disk 2 is held in place. Thus, if the optical disk 2 incurs any displacement, all detection signals will be generated by the displacement measuring device 9 on the basis of the displacement of the optical disk 2.

Figure 3:
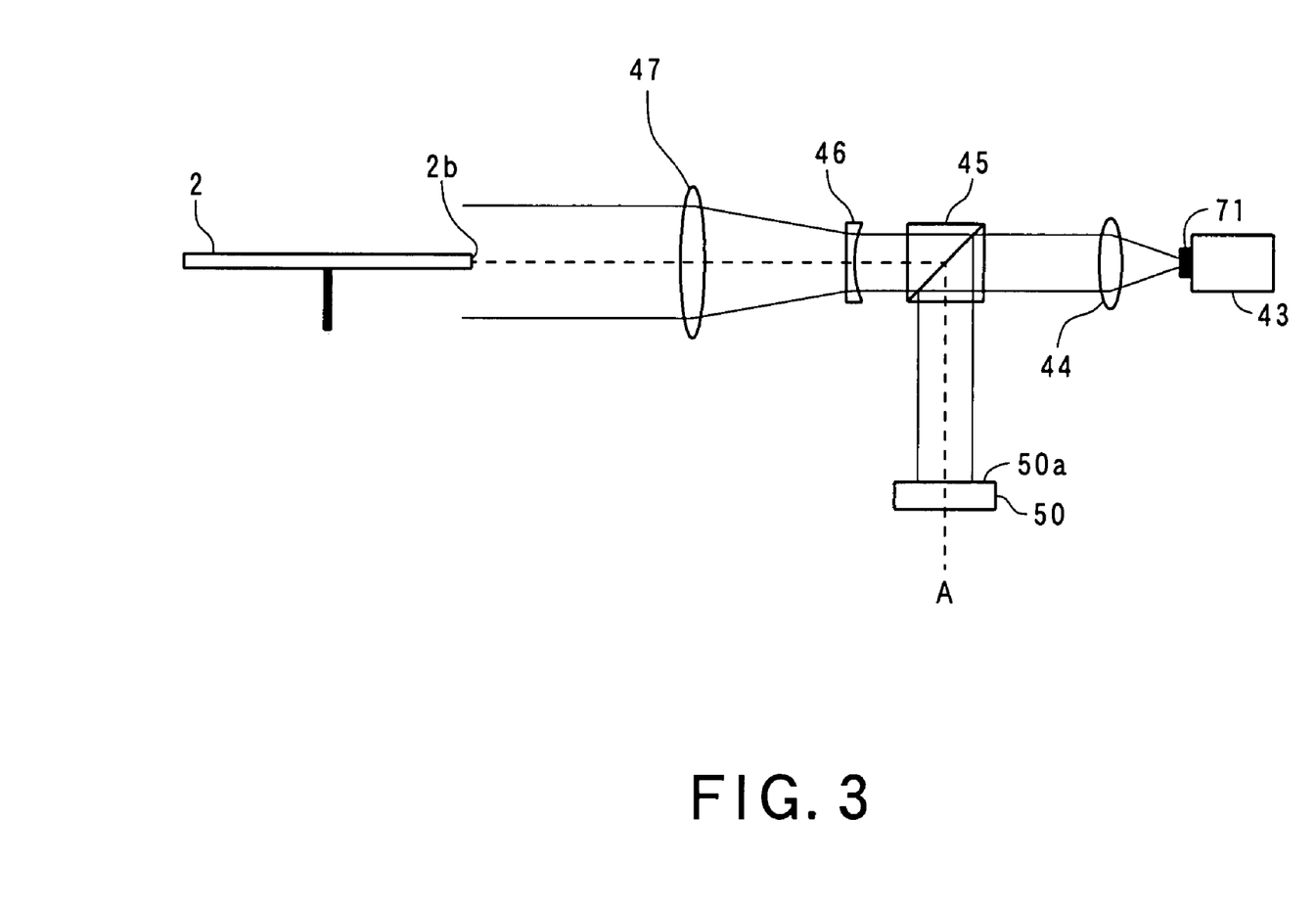
FIG. 3 shows an example of the return light detection when the optical disk incurs no displacement.

The displacement measuring device 9 constructed as above operates as will be described below:

In case the optical disk 2 incurs no displacement as shown in FIG. 3, only a laser light component, passing by near the beam center, of a parallel light having passed by the second collimator lens 47 is reflected by the peripheral side face 2b of the optical disk 2, passes by the second collimator lens 47 and concave lens 46, and is then reflected by the beam splitter 45. As a result, a return light will be detected in a position A at the center of the light-detecting surface 50a of the light-detecting element 50.

Figure 4:
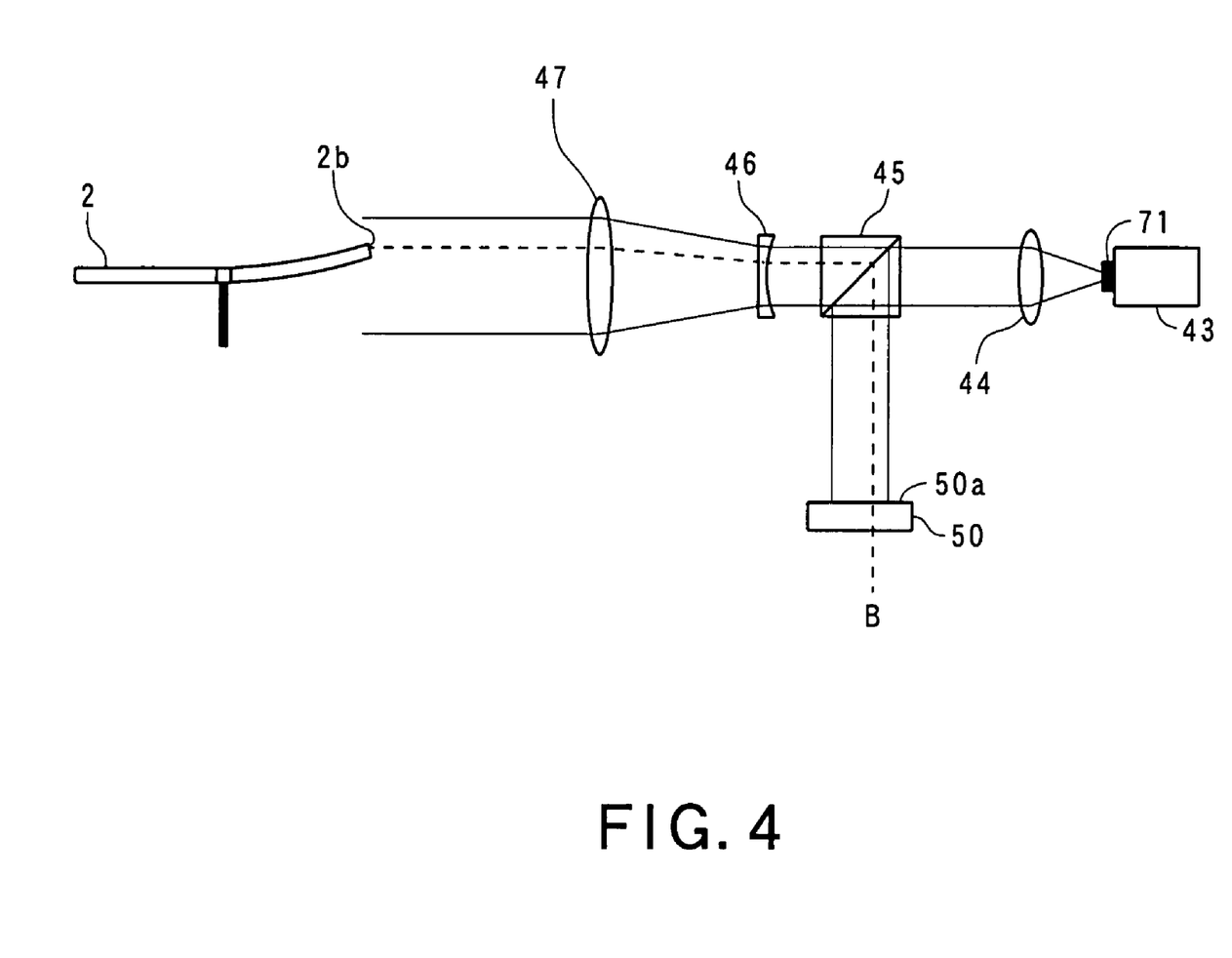
FIG. 4 shows an example of the return light detection when the peripheral side face of the optical disk is warped upward at one end thereof.

Also, in case the optical disk 2 is warped upward at one end of the peripheral side face 2b thereof as shown in FIG. 4, only a laser light component, passing by near the peripheral side face 2b warped upward, of a parallel light having passed by the second collimator lens 47 is reflected, passes by the second collimator lens 47 and concave lens 46, an is then reflected by the beam splitter 45. As a result, a return light will be detected in a position B at the right of the center of the light-detecting surface 50a of the light-detecting element 50.

Figure 5:
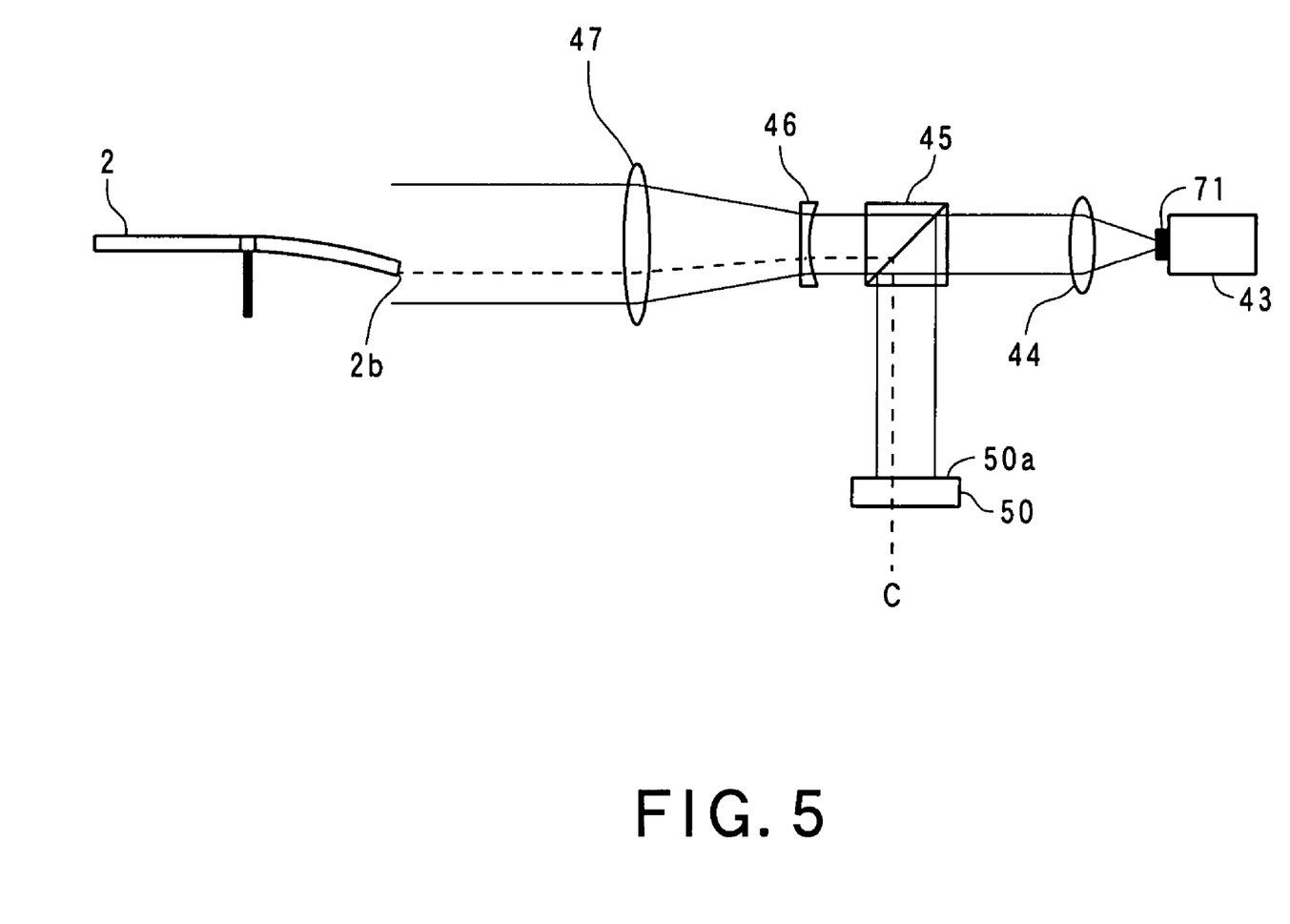
FIG. 5 shows an example of the return light detection when the peripheral side face of the optical disk is warped downward at one end thereof.

Also, in case the optical disk 2 is warped downward at one end of the peripheral side face 2b thereof as shown in FIG. 5, only a laser light component, passing by near the peripheral side face 2b warped downward, of a parallel light having passed by the second collimator lens 47 is reflected, passes by the second collimator lens 47 and concave lens 46, an is then reflected by the beam splitter 45. As a result, return light will be detected in a position C at the left of the center of the light-detecting surface 50a of the light-detecting element 50.

Figure 6:
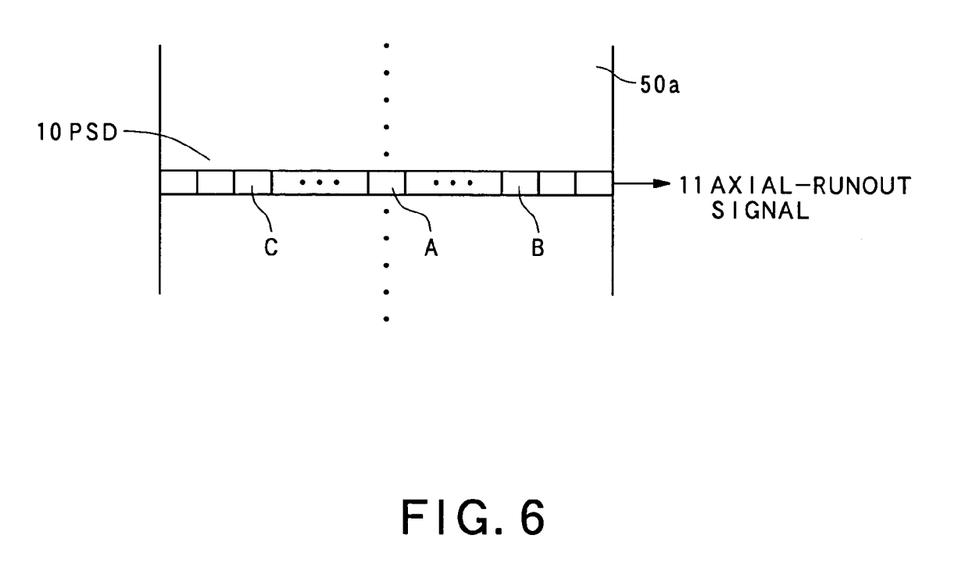
FIG. 6 schematically shows photoelectric-conversion positions on the light-detecting surface of a light-detecting element.

As above, the return light from the peripheral side face 2b of the optical disk 2 is detected in different positions on the light-detecting element 50 correspondingly to a displacement of the optical disk 2. As shown in FIG. 6 for example, in case the optical disk 2 incurs no displacement, the return light is converted into an electricity in the position A on the light-detecting surface 50a of the light-detecting element 50. In case the peripheral side face 2b is warped downward at one end thereof, the return light undergoes photoelectric conversion in the position C on the light-detecting surface 50a. Each detection signal generated through the photoelectric conversion by the light-detecting element 50 is sent to the signal processing circuit 5.

Figure 7:
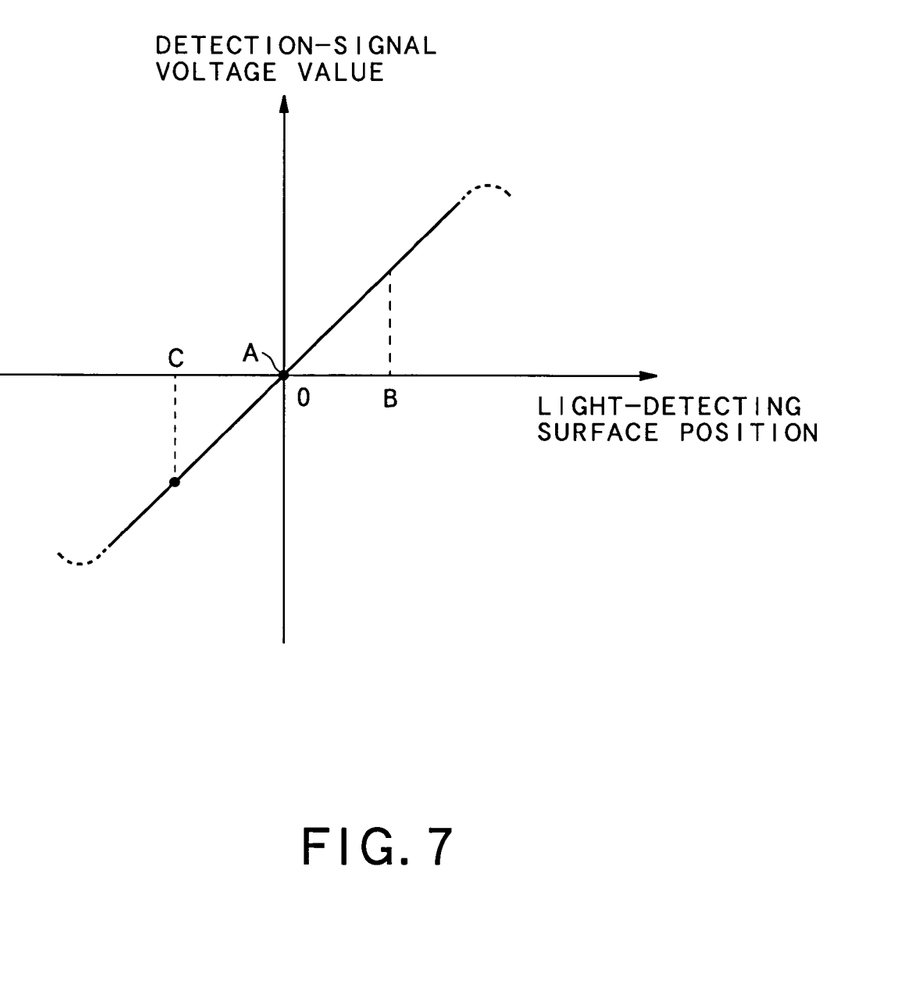
FIG. 7 graphically shows a voltage value of each detection signal generated through photoelectric conversion at each of light-incident positions A to C on the light-detecting surface.

FIG. 7 graphically shows a voltage value of each detection signal generated through the photoelectric conversion at each of light-incident positions A to C on the light-detecting surface 50a. In case the return light has undergone the photoelectric conversion in the position A as above, the detection signal will have a voltage of 0 V. In case the return light has been photoelectrically converted in the position B because the peripheral side face 2b of the optical disk is warped upward, the voltage of the detection signal will have a positive value corresponding to the extent of a displacement from the position A. On the other hand, in case the return light has been converted into an electricity in the position C because the peripheral side face 2b of the optical disk is warped downward, the detection signal will have a negative voltage corresponding to the extent of a displacement from the position A.

The signal processing circuit 5 will be able to easily discriminate a current displacement, set state, etc. of the optical disk 2 on the basis of the voltage value and polarity of such a detection signal.

Figure 8:
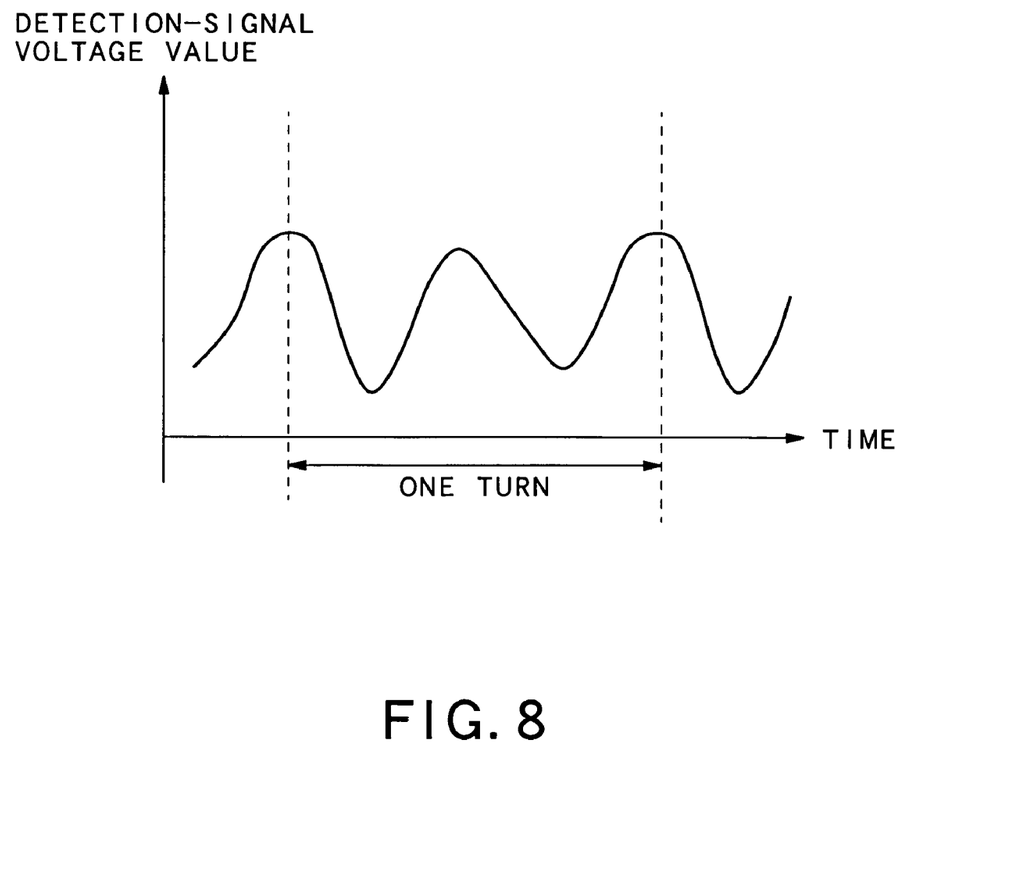
FIG. 8 graphically shows a variation of the voltage value of the detection signal when the optical disk is rotated at a predetermined velocity for measurement of a displacement of the optical disk.

Note that when measuring a displace of the optical disk 2 by the displacement measuring device 9, the voltage value of the detection signal will vary periodically as shown in FIG. 8 by rotating the optical disk 2 by the spindle motor 3 at a predetermined velocity under the control of the system controller 8. The signal processing circuit 5 can easily measure the distance and direction of a displacement of the optical disk 2 on the basis of such a voltage value of the detection signal.

More specifically, the displacement measuring device 9 can detect a displacement of the optical disk 2 as a voltage variation of the detection signal by rotating the optical disk 2 being under measurement. Thus, it is possible to easily discriminate a displacement of the optical disk 2 on the basis of such a voltage variation even if the optical disk 2 is not adjusted in position for the beam center of a parallel light from the second collimator lens 47 to be coincident upon the peripheral side face 2b of the optical disk 2. In particular, although the light beam from the second collimator lens 47 has to be adjusted with a high accuracy in some cases, the displacement measuring device 9 according to the present invention is advantageous in that such troublesome adjusting operations are not required.

Namely, the displacement measuring device 9 according to the present invention emits laser light from the lateral side of the optical disk 2 set in place to the peripheral side face 2b of the latter, detects return light from the peripheral side face 2b irradiated with the laser light, and measures a displacement of the optical disk 2 on the basis of the detected amount of return light.

Thus, the displacement measuring device 9 according to the present invention needs not to use any laser interference but can easily discriminate an optical-disk displacement only with analysis of a detected return-light amount. Requiring no separate interference optical system, the displacement measuring device 9 can be designed smaller as a whole. Also, the displacement measuring device 9 according to the present invention is advantageous in the respect of the costs since it requires no troublesome calibration of any interference optical system.

Also, the displacement measuring device 9 according to the present invention permits a stable measurement as compared with the conventional capacitance method and also needs no such troublesome calibration as required for each optical disk in the conventional eddy-current method, for which it is possible to measure an optical-disk displacement with a considerably less labor. Further, since the displacement measuring device 9 according to the present invention is capable of a displacement measurement without any contact with the information recording surface 2a or the like of the optical disk 2, so it will never damage the information recording medium 2a itself.

Note that the optical recorder/player 1 having provided therein the displacement measuring device 9 according to the present invention as a displacement pickup may be designed to use a measured displacement of the optical disk 2 as a feed-forward control signal when adjusting the focusing of the optical head 4 in relation to the information recording surface 2a.

Figure 9:
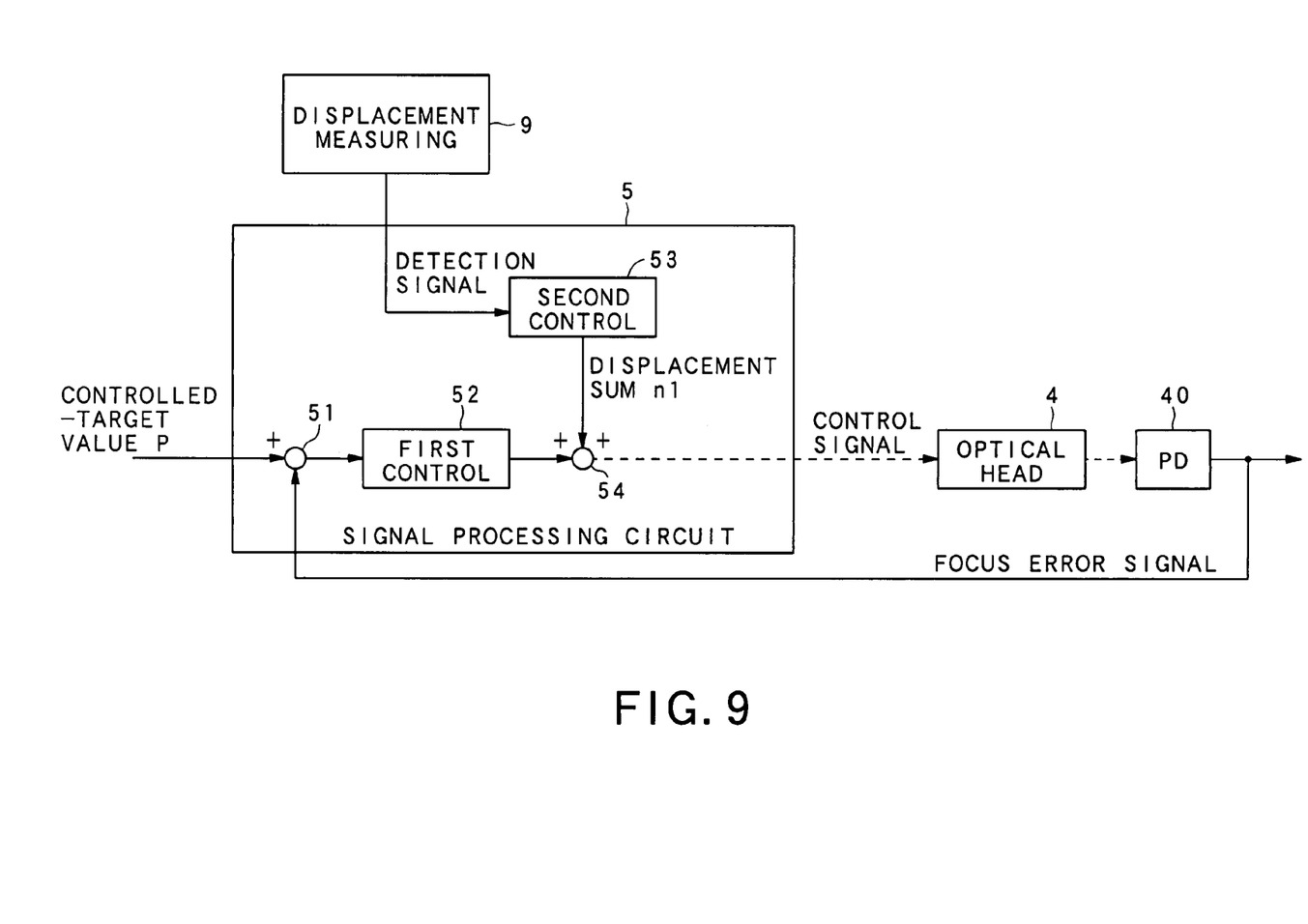
FIG. 9 is a schematic block diagram of a signal processing circuit provided in the optical recorder/player to implement a feed-forward control.

Referring now to FIG. 9, there is schematically illustrated in the form of a block diagram the signal processing circuit 5 provided in the optical recorder/player 1 designed to implement a feed-forward control. As shown, the signal processing circuit 5 includes a subtracter 51 that makes a comparison between a controlled-target value P intended for controlling the gap between the optical head 4 and information recording surface 2a to a fixed value and the voltage value of a focus error signal to determine a deviation between them, a first controller 52 that controls the gap to a fixed value for both write and read modes of the recorder/player 1, a second controller 53 that calculates a displacement sum n1 for the radii recording tracks formed concentrically on the information recording surface 2a on the basis of the detection-signal voltage value supplied from the displacement measuring device 9, and an adder 54 that adds together outputs from the first and second controllers 52 and 53, respectively, to provide a control signal.

The first controller 52 is supplied, from the subtracter 51, with a deviation between the controlled-target value P and voltage value of a focus error signal. The first controller 52 generates a control signal Vg for controlling the gap length to a fixed value on the basis of the supplied deviation, and supplies it to the adder 54. Thus, a so-called feedback control is implemented.

Figure 10:
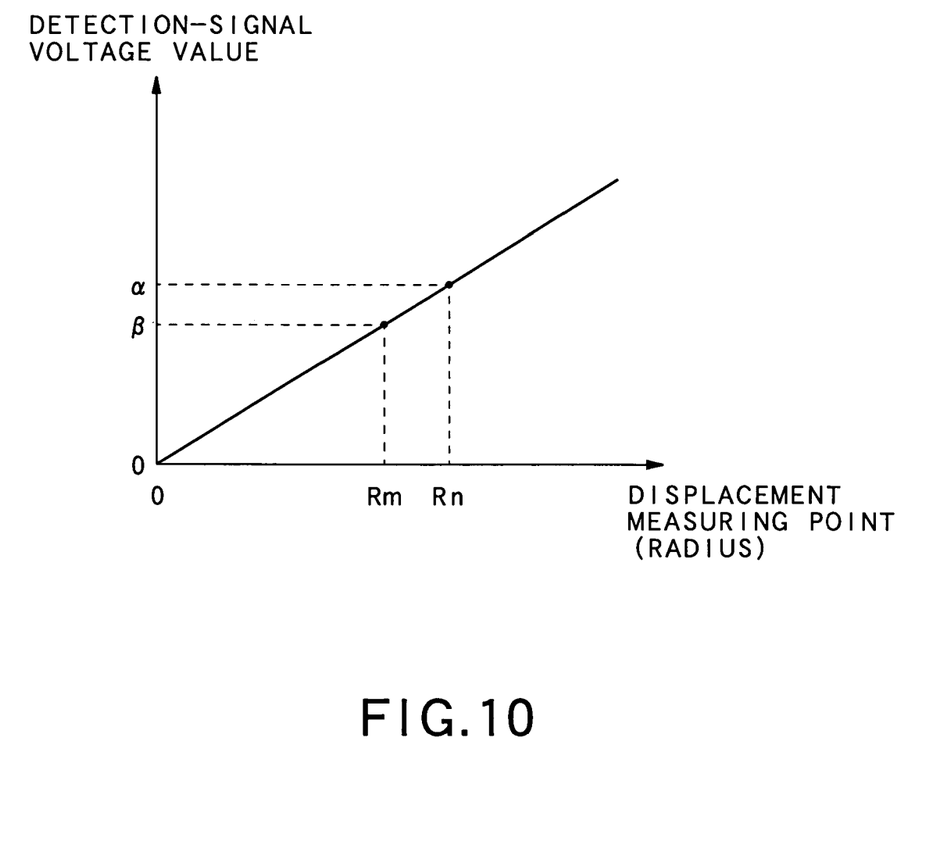
FIG. 10 graphically illustrates a relation between a displacement measuring point and detection-signal voltage value.

The second controller 53 discriminates a detection-signal voltage value supplied from the displacement measuring device 9, first. Since the displacement of the optical disk 2 is normally larger as it goes toward the periphery of the optical disk 2, so the detection-signal voltage value will increase as the displacement measuring point represented by the radius of the optical disk 2 moves toward the periphery of the optical disk 2 as shown in FIG. 10.

Since the detection signal from the displacement measuring device 9 is based on the return light from the peripheral side face 2b of the optical disk 2 as having previously been described, so the second controller 53 having acquired a detection signal whose voltage value α corresponds to a radius Rn of the peripheral side face 2b can calculate a detection-signal voltage value β for a radius Rm on the basis of the following equation (1). It should be noted that for the equation (1), it is assumed that there is a linear relation between the detection-signal voltage value and displacement measuring point.

$$\beta = (Rm/Rn) \times \alpha \tag{1}$$

On the assumption that the radius Rm is a radius of a recording track to or from which the optical head 4 is currently writing or reading information signals, the voltage value β can be calculated based on the recording track. In such a case, the radius Rm may be determined by detecting a radial moving distance of the optical head 4 by means of the potentiometer 15.

The second controller 53 determines the displacement sum n1 on the basis of the calculated detection-signal voltage value β. The displacement sum n1 is added by the adder 54 to the control signal Vg to provide a control signal which will be sent to the optical head 4. Thus, the so-called feed-forward control will be implemented.

More particularly, the second controller 53 determines a larger displacement sum n1 as the detection-signal voltage value β is larger. Thus, as the position of the optical head 4 is nearer to the periphery of the optical disk 2, the extent of focusing of the optical head 4 can be increased, to thereby permit the optical head 4 to catch up with a displacement of the optical disk 2, caused by an axial runout or the like. Also, any displacement portion that cannot be accommodated by the feed-forward control can be removed by the aforementioned feed-back loop, whereby the gap length can always be controlled to a fixed value.

On this account, in the recorder/player 1 according to the present invention, a relation between the displacement measuring point and detection-signal voltage value as shown in FIG. 10 is stored in a memory (not shown), and a voltage value β is determined by calculating the equation (1) correspondingly to a recording track to or from which information signals are currently being written or read. Thereby, it is made possible to control the gap length to a fixed value for any displacement measuring point on the optical disk 2.

Note that the displacement measurement according to the present invention has been described in the foregoing concerning the recorder/player 1 that writes and/or reads information signals to the optical disk 2 by way of example. However, the present invention is not limited to this example, but the displacement measurement can be effected in a recorder that effects only the aforementioned signal write or in a player that effects only the aforementioned signal read.

More specifically, when writing information signals to the optical disk 2 in the recorder using the displacement measuring device 9 according to the present invention, the optical disk 2 set in place is rotated, laser light is irradiated from the lateral side of the optical disk 2 to the peripheral side face 2a of the latter, return light from the peripheral side face 2a irradiated with the laser light is detected, and a displacement of the optical disk 2 is measured based on to the detected amount of return light. Also, focusing of the laser light in relation to the information recording surface 2a of the optical disk 2 is adjusted correspondingly to the measured displacement.

Thus, the recorder using the displacement measuring device 9 according to the present invention can real-time measure a displacement of the optical disk 2 during the recording operation, and also have the optical head 4 catch up with such a displacement of the optical disk 2 under the feed-forward control as necessary. Also, since the recorder does not have to use the laser interference in measuring a displacement of the optical disk 2, the recorder can be designed compact. In addition, since the recorder needs no troublesome interference optical system, it is also advantageous in the respect of costs.

Also, when reading information signals from the optical disk 2 in the player using the displacement measuring device 9 according to the present invention, the optical disk 2 set in place is rotated, laser light is irradiated from the lateral side of the optical disk 2 to the peripheral side face 2a of the latter, return light from the peripheral side face 2a irradiated with the laser light is detected, and a displacement of the optical disk 2 is measured based on the detected amount of return light. Also, focusing of the laser light in relation to the information recording surface 2a of the optical disk 2 is adjusted based on the measured displacement.

Thus, the player using the displacement measuring device 9 according to the present invention can real-time measure a displacement of the optical disk 2 during the playback operation, and also have the optical head 4 catch up with such a displacement of the optical disk 2 under the feed-forward control as necessary. Also, since the player does not have to use the laser interference in measuring a displacement of the optical disk 2, the player can be designed compact. In addition, since the player needs no troublesome interference optical system, it is also advantageous in the respect of costs.

Note that in the aforementioned displacement measuring device 9, adjusting the parallel light from the second collimator lens 47 to be parallel to the information recording surface 2a of the optical disk 2 permits to make the parallel light perpendicular to the peripheral side face 2b of the optical disk 2 so that the return light can be reflected in more amount by the peripheral side face 2b, which leads to an improved accuracy of measurement.

In the foregoing, the present invention has been described in detail concerning certain preferred embodiments thereof as examples with reference to the accompanying drawings. However, it should be understood by those ordinarily skilled in the art that the present invention is not limited to the embodiments but can be modified in various manners, constructed alternatively or embodied in various other forms without departing from the scope and spirit thereof as set forth and defined in the appended claims.

According to the present invention, the laser light outgoing from the second collimator lens 47 may be made to go at any angle along which the laser light would be incident from the lateral side of the optical disk 2 upon the peripheral side face 2b of the latter. Also, according to the present invention, the parallel light from the second collimator lens 47 may be guided in any way to form a light spot on the peripheral side face 2b of the optical disk 2. The return light from the peripheral side face 2a irradiated with the laser light may be detected at any angle.

Also, since the displacement of the optical disk 2 is small, even a laser light whose beam width is small can be made correctly incident upon the peripheral side face 2a of the optical disk 2. So, the concave lens 46 and second collimator lens 47 may be omitted from the displacement measuring device 9. In this case, the recorder/player 1 can be designed more compact.

Further, the present invention has been described in the foregoing concerning the displacement measuring device 9 using PSD as the light-detecting element. However, a displacement of the optical disk 2 may be discriminated on the amount of return light. If the optical disk 2 incurs any displacement, the peripheral side face thereof will be inclined and so the return light from the peripheral side face will vary in amount. Thus, the displacement measuring device 9 can easily discriminate a displacement of the optical disk 2 on the basis of the variation in amount of the return light.

As having been described in the foregoing, in the displacement measuring device and method according to the present invention, laser light is irradiated from the lateral side of an optical disk set in place to the peripheral side face of the latter, return light from the peripheral side face irradiated with the laser light is detected, and a displacement of the optical disk is measured based on the detected amount of return light.

Thus, the displacement measuring device and method according to the present invention needs not to use any laser interference but can easily discriminate an optical-disk displacement only with analysis of a detected return-light amount. Requiring no separate interference optical system, the displacement measuring device can be designed smaller as a whole. Also, the displacement measuring device according to the present invention is advantageous in the respect of the costs since it requires no troublesome calibration of any interference optical system.

Also, in the recorder and recording method according to the present invention, when writing information signals to an optical disk, the optical disk set in place is rotated, laser light is irradiated from the lateral side of the optical disk to the peripheral side face of the latter, return light from the peripheral side face irradiated with the laser light is detected, and a displacement of the optical disk is measured based on to the detected amount of return light, and focusing in relation to the information recording surface of the optical disk is adjusted correspondingly to the measured displacement.

Thus, the recorder and recording method according to the present invention can real-time measure a displacement of the optical disk during the recording operation, and also have the optical head 4 catch up with such a displacement of the optical disk under the feed-forward control as necessary. Also, since the recorder does not have to use the laser interference in measuring a displacement of the optical disk, the recorder can be designed compact. In addition, since the recorder needs no troublesome interference optical system, it is also advantageous in the respect of costs.

Also, when reading information signals from an optical disk in the reproducing apparatus and method according to the present invention, an optical disk set in place is rotated, laser light is irradiated from the lateral side of the optical disk to the peripheral side face of the latter, return light from the peripheral side face irradiated with the laser light is detected, and a displacement of the optical disk is measured based on the detected amount of return light. Also, focusing of the laser light in relation to the information recording surface of the optical disk is adjusted based on the measured displacement.

Thus, the player according to the present invention can real-time measure a displacement of the optical disk during the playback operation, and also have the optical head catch up with such a displacement of the optical disk under the feed-forward control as necessary. Also, since the player does not have to use the laser interference in measuring a displacement of the optical disk, the player can be designed compact. In addition, since the player needs no troublesome interference optical system, it is also advantageous in the respect of costs.

What is claimed is:

1. A playback method comprising the steps of:
    irradiating laser light onto a peripheral side face of an optical disk;
    detecting return light from the peripheral side face irradiated with the laser light;
    measuring a displacement of the optical disk on the basis of a detection signal generated based on a displacement of the return light; and
    adjusting focus control at an optical head based on the measured displacement of the optical disk.

2. The device according to claim 1, wherein:
    the optical disk set in place is rotated for measurement of any displacement; and
    a displacement of the optical disk is measured based on a variation of the detection signal generated based on the displacement of the return light.

3. The device according to claim 1, wherein the laser light is irradiated generally in parallel with an information recording surface of the optical disk.

4. The device according to claim 1, wherein a parallel laser light is irradiated to the peripheral side face of the optical disk.

5. A recording/playback apparatus for recording or reproducing information signals on an information recording surface of an optical disk, the apparatus comprising:
    a disk seat configured to set the optical disk in place;
    a spindle motor configured to rotate the optical disk set in place on the disk seat;
    a laser configured to irradiate laser light onto a peripheral side face of the optical disk;
    a detector configured to detect return light from the peripheral side face irradiated with the laser light;
    a measuring unit configured to measure a displacement of the optical disk on the basis of a detection signal generated based on a displacement of the return light detected by the detector; and
    a servo control mechanism configured to adjust focus control at an optical head based on the disk displacement measured by the measuring unit.

6. The apparatus according to claim 5, wherein the laser irradiates the laser light generally in parallel with the information recording surface of the optical disk.

7. The apparatus according to claim 5, wherein the laser irradiates a parallel laser light to the peripheral side face of the optical disk.

8. A recording/playback method of recording or reproducing information signals on an information recording surface of an optical disk, the method comprising the steps of:
    rotating the optical disk set in place;
    irradiating laser light onto a peripheral side face of the optical disk;
    detecting return light from the peripheral side face irradiated with the laser light;
    measuring a displacement of the optical disk on the basis of a detection signal generated based on a displacement of the return light; and
    adjusting focus control at an optical head based on the measured disk displacement.

9. The method according to claim 8, wherein the laser light is irradiated generally in parallel with an information recording surface of the optical disk.

10. The method according to claim 8, wherein a parallel laser light is irradiated to the peripheral side face of the optical disk.

* * * * *